United States Patent Office 2,881,184
Patented Apr. 7, 1959

2,881,184

PYRROLE-CONTAINING ORGANOSILICON COMPOUNDS AND PROCESS FOR PRODUCING THE SAME

Ronald M. Pike, Grand Island, N.Y., assignor to Union Carbide Corporation, a corporation of New York No Drawing. Application October 12, 1956
Serial No. 615,512

9 Claims. (Cl. 260—326.5)

This invention relates to organosilicon compounds and to processes for producing the same. More particularly, the invention is concerned with organosilicon compounds containing among other possible functional groups, a pyrrole group attached to a silicon atom or atoms through a polymethylene chain containing at least three carbon atoms, as new compositions of matter and to processes for the production thereof.

The present invention is based, in part, upon my discovery that organosilicon compounds containing a pyrrole group in which the nitrogen atom is linked to a silicon atom through a polymethylene linkage containing at least three carbon atoms can be produced by the reaction of an organosilicon compound containing an aminoalkylsilyl grouping [H$_2$N(CH$_2$)$_a$Si≡, wherein (a) has a value of at least 3] with a gamma-diketone as illustrated by the following general formula:

H$_2$N(CH$_2$)$_a$Si≡ + B—C—CH$_2$CH$_2$—C—B ⟶
$\qquad\qquad\qquad\quad$ ‖ $\qquad\qquad\quad$ ‖
$\qquad\qquad\qquad\quad$ O $\qquad\qquad\quad$ O

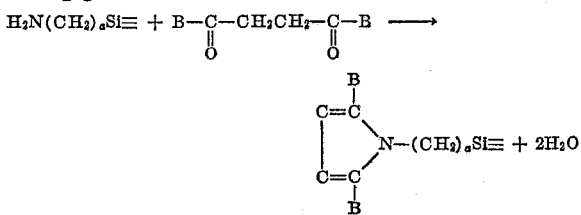

wherein (a) has a value of at least 3 and B represents an alkyl group.

According to my studies the reaction is a general one and is applicable to all organosilicon compounds which contain the aminoalkylsilyl grouping depicted above and all gamma-diketones.

Most suitable for use as the starting aminoalkyl silicon compounds in my process are the aminoalkylalkoxysilanes and the aminoalkylpolysiloxanes, including copolymeric materials which contain both aminoalkylsiloxane and hydrocarbon siloxane units. Typical of the aminoalkylalkoxysilanes which I can employ as my organosilicon starting materials are those compounds represented by the structural formula:

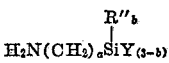

H$_2$N(CH$_2$)$_a$SiY$_{(3-b)}$ wherein R″ represents an alkyl group such as methyl, ethyl, propyl, butyl and the like, or an aryl group such as phenyl, naphthyl, tolyl and the like, Y represents an alkoxy group such as methoxy, ethoxy, propoxy and the like, (a) is an integer having a value of at least 3 and preferably a value of from 3 to 4 and (b) is an integer having a value of from 0 to 2 and preferably a value of from 0 to 1. Illustrative of such aminoalkylalkoxysilanes are gamma-aminopropyltriethoxysilane, gamma-aminopropylmethyldiethoxysilane, gamma-aminopropylethyldiethoxysilane, gamma - aminopropylphenyldiethoxysilane, delta-aminobutyltriethoxysilane, delta-aminobutylmethyldiethoxysilane, delta - aminobutylethyldiethoxysilane, delta-aminobutylphenyldiethoxysilane and the like.

Typical of the aminoalkylpolysiloxanes suitable for use as my organosilicon starting materials are those polysiloxanes which contain the structural unit:

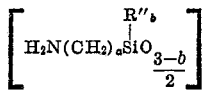

wherein R″, (a) and (b) have the same values described above. Such polysiloxanes are prepared by the hydrolysis and condensation of those aminoalkylalkoxysilanes described above or by the co-hydrolysis and co-condensation of such aminoalkylalkoxysilanes with other hydrolyzable silanes and can include: aminoalkylpolysiloxanes of the trifunctional variety (i.e. where b=0), aminoalkylalkyl- and aminoalkylarylpolysiloxanes of the difunctional variety which include the cyclic or linear polysiloxanes (i.e. where b=1) and linear aminoalkyldialkyl-, aminoalkyldiaryl- and aminoalkylarylalkyldisiloxanes of the monofunctional variety (i.e. where b=2) as well as mixtures of compounds produced by the cohydrolysis of difunctional and monofunctional aminoalkylsilanes.

Suitable starting aminoalkylpolysiloxanes of the trifunctional variety can be more specifically depicted as containing the structural unit:

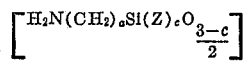

wherein (a) has the value previously described, Z represents an hydroxyl and/or alkoxy group and (c) has an average value of from 0 to 1.0 and can be as high as 2, but is preferably from 0.1 to 1.

Aminoalkylpolysiloxanes of this variety which are essentially free of silicon-bonded alkoxy or hydroxyl groups (i.e. where c=0 can be prepared by the complete hydrolysis and complete condensation of aminoalkyltri-alkoxysilanes, whereas aminoalkylpolysiloxanes in which Z is predominately alkoxy, can be prepared by the partial hydrolysis and complete condensation of the same starting silanes. On the other hand, aminoalkylpolysiloxanes in which Z is predominately hydroxyl, can be prepared by the essentially complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present in the starting silane and subsequently condensing the hydrolyzate so produced to the desired polymer.

Suitable starting aminoalkylpolysiloxanes of the difunctional variety which include the cyclic and linear polysiloxanes can be more specifically defined by the structural formula:

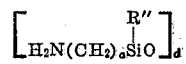

wherein R″ and (a) have the values previously described and d is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyl- or aminoalkylaryldialkoxysilanes. In carrying out the hydrolysis and condensation procedures there is produced a product comprising a mixture of cyclic and linear polysiloxanes from which the desired polysiloxane can be recovered. Illustrative of the cyclic aminoalkyl siloxanes suitable for use as the organosilicon starting material in my process are the cyclic tetramer of gamma-aminopropylmethylsiloxane, the cyclic tetramer of delta-aminobutylphenylsiloxane and the like. Illustrative of suitable linear aminoalkylpolysiloxanes are gamma-aminopropylmethylpolysiloxane, gamma-aminopropylethylpolysiloxane, delta-aminobutylmethylpolysiloxane and the like.

Included among the useful starting linear aminoalkylpolysiloxanes are the alkyl, alkoxy and hydroxyl end-blocked polysiloxanes which contain from 1 to 3 of such groups bonded to the terminal silicon atoms of the molecules comprising the polymeric chains. Thus we can also employ as our starting materials such linear end-blocked aminoalkylpolysiloxanes as monoethoxy end-blocked gamma-aminopropylethylpolysiloxane or methyldiethoxysilyl end - blocked delta-aminobutylmethylpolysiloxane or monoethoxydimethylsilyl end-blocked gamma-aminopropylphenylpolysiloxane and the like. The end-blocked linear aminoalkylalkyl- and aminoalkylarylpolysiloxanes useful in my process can be prepared by the equilibration of cyclic aminoalkylsiloxanes with silicon compounds containing predominately silicon-bonded alkoxy groups, or by the co-hydrolysis and condensation of trialkylalkoxysilanes with aminoalkylalkyl- or aminoalkylaryldiethoxysilanes. Hydroxy end-blocked linear polysiloxanes can be prepared by heating linear or cyclic aminoalkylpolysiloxanes with water.

The copolymeric aminoalkylpolysiloxanes which can be employed as the starting material can be depicted as containing both the structural units:

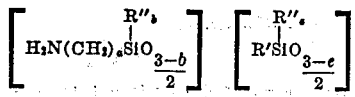

wherein R', (a) and (b) have the values described above, R'' represents an alkyl or aryl group and (e) is an integer having a value of from 0 to 2. Our copolymers can be mixtures of trifunctional aminoalkylpolysiloxanes (where b=0) with trifunctional alkyl-, aryl, or mixed alkyl- and arylpolysiloxanes (where e=0) or with difunctional alkyl, aryl- or mixed alkyl- and arylpolysiloxanes (where e=1). They can also include mixtures of difunctional aminoalkylpolysiloxanes (where b=1) with trifunctional alkyl-, aryl- or mixed alkyl- and arylpolysiloxanes (where b=0) or with difunctional alkyl-, aryl- or mixed alkyl- and arylpolysiloxanes (where e=1).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded hydroxyl or alkoxy groups or they can comprise essentially completely condensed materials. The linear and cyclic copolymeric siloxanes are preferably prepared by the separate hydrolysis and condensation of an aminoalkylalkyl- or aminoalkylaryldialkoxysilane and the dialkyl- or diaryldialkoxysilane to cyclic aminoalkylsiloxanes and cyclic dialkyl- or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

The aminoalkylalkoxysilanes and aminoalkylpolysiloxanes as well as copolymers containing aminoalkylsiloxane and hydrocarbon siloxane units are all disclosed and claimed as new compositions of matter in copending U.S. applications Serial Nos. 615,466, 615,481, 615,483 and 615,507 filed concurrently herewith. Process for producing such compounds are also disclosed and claimed in said copending applications.

The gamma-diketones which can be employed as one of the starting materials of my process to produce the pyrrole-containing organosilicon compounds of my invention can be graphically depicted by the following structural formula:

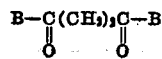

where B represents an alkyl group such as methyl, ethyl, propyl and the like. Typical of such compounds are acetonyl acetone, 3, 6-octadione and the like.

The process of the invention can be carried out by forming a mixture of an organosilicon compound containing the aminoalkylsilyl grouping depicted above with a gamma-diketone and heating the mixture to a temperature sufficiently elevated to cause the organosilicon compound and gamma-diketone to react. There results or is produced an organosilicon compound containing a pyrrole group attached to a silicon atom, or atoms thereof, through a polymethylene chain containing at least 3 carbon atoms and water.

The relative amounts of the organosilicon compound containing the aminoalkylsilyl grouping and of the gamma-diketone used as the starting materials in my process are not narrowly critical. I can employ for each gram atom of nitrogen present in the starting organosilicon compound from ½ to 10 moles of the gamma-diketone. I prefer to employ for each gram atom of nitrogen present in the starting organosilicon compound from 1 to 2 moles of the gamma-diketone. Relative amounts of the starting materials other than those described can be employed, however, no commensurate advantage is obtained thereby.

The reaction between my starting compounds can be carried out at temperatures which are not narrowly critical and which can vary over a wide range. I can employ temperatures of from about 100° to about 180° C., however, I prefer to conduct the reaction at temperatures of from about 130° to about 160° C. Temperatures outside of the broader range set forth above can also be employed, however, no significant advantage is obtained thereby.

The reaction between organosilicon compounds containing the aminoalkylsilyl grouping and the diketones can be carried out within a liquid organic compound in which the starting materials are mutually soluble and which is non-reactive therewith.

When aminoalkylalkoxysilanes are used as the organosilicon starting materials in producing the compositions of this invention, the liquid organic compound within which the reaction can be carried out is preferably a compound that is miscible with water. The use of liquid organic compounds that dissolve the aminoalkylalkoxysilane and the diketone starting materials and that are miscible with water was found to minimize the hydrolysis of the alkoxy groups of the aminoalkylalkoxysilane starting material by the water produced in the reaction. Illustrative of such liquid organic compounds are the cyclic ethers such as tetrahydrofuran and compounds that are represented by the formulae R'''O(CH₂CH₂O)$_x$H and wherein R''' is an alkyl group that contains from 1 to 6 carbon atoms and (x) is an integer that has a value of from 1 to 2.

When aminoalkylpolysiloxanes are used as the starting organosilicon material in producing the compounds of this invention, the liquid organic compound within which the reaction can be carried out is preferably one that is not miscible with water, although the cyclic ethers and oxyalkylene compounds described above can also be employed. Liquid organic compounds of the latter type are particularly useful in separating water from the reaction mixture. Illustrative of the liquid organic compounds which can be employed when our starting aminoalkyl silicon compounds are aminoalkylpolysiloxanes are petroleum ether and aromatic hydrocarbons such as benzene, toluene and xylene.

The amount of the liquid organic compound, within which the reaction can be carried out, is not narrowly critical. I can employ such liquid organic compounds in amounts of from about 10 parts to about 400 parts by weight per 100 parts by weight of the organosilicon and diketone starting materials. Amounts of such liquid organic compounds, when employed, of from 20 parts to 100 parts by weight per 100 parts by weight of the organosilicon and diketone starting materials are preferred in conducting the reaction. Amounts of these liquid organic compounds other than those described above may be used; however, no commensurate advantage is gained thereby.

As described above, one of the products formed by the reaction between an organosilicon compound containing the aminoalkylsilyl grouping and a diketone is water. This water can be removed from the reaction mixture by distillation or by adding thereto a liquid organic compound of the above-described type that not only dissolves the starting materials but also forms an azeotrope with water and heating the reaction mixture to a temperature sufficiently elevated to volatilize the azeotrope. The volatilized azeotrope may be condensed, the condensate freed of water to produce the anhydrous liquid organic compound and the anhydrous liquid organic compound may be returned to the reaction mixture. Alternately the water may be removed from the reaction mixture by adding a hydrophilic absorbent or adsorbent to the reaction mixture.

The pyrrole-containing organosilicon compounds of the invention can be graphically depicted by the formula:

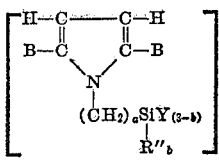

wherein B, R", Y, (a) and (b) have the values defined above. Typical of such compounds are gamma(2,5-dimethylpyrryl)propyltriethoxysilane, delta(2,5-dimethylpyrryl)butylmethyldiethoxysilane and the like.

The pyrrole-containing copolymeric organosilicon compounds of the invention can be graphically depicted by the formulae

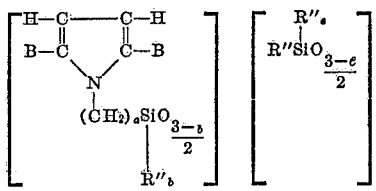

wherein B, R", R", (a), (b) and (e) have the values defined above; and wherein the polymeric organosilicon compounds may contain alkoxy or hydroxyl groups bonded to some of the silicon atoms.

In producing the organosilicon compounds of this invention substituted gamma-diketones and gamma-ketoaldehydes can also be employed as one of the starting materials of my process. Typical of such compounds are phenacylacetoacetic ester

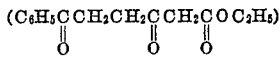

di-acetoacetic ester

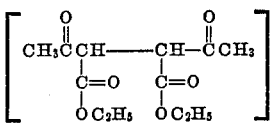

levulin aldehyde

and the like.

The pyrrole-containing organosilicon compounds of my invention find use as sizes for fibrous materials, particularly fibrous glass materials. They can also be employed as adhesives and as modifiers for lubricating oils and organic thermosetting resins. The compounds can also be cohydrolyzed or equilibrated with dimethyl silicone oils to produce improved silicone oils and gums. A further application in which the pyrrole-containing organosilicon compounds of the invention are useful lies in the preparation of silicone thermosetting resins where they can be cohydrolyzed or coequilibration with trifunction methyl and phenyl silanes to improve the properties thereof as coatings and as molding materials.

The following example is illustrative of the present invention.

Example I

Reaction of gamma-aminopropyltriethoxysilane with acetonyl acetone

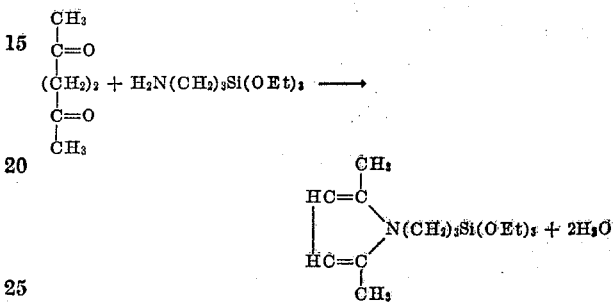

In a 100 cc. flask attached to a still head protected by a calcium chloride drying tube, was placed 0.045 mole (10.0 grams) of gamma-aminopropyltriethoxysilane and 0.05 mole (5.7 grams) of acetonylacetone (2,5-hexanedione). The mixture formed a homogeneous solution and was heated at 140°–150° C. for one hour, removing the distillate (amounting to 2.0 ml.) as it came over. The resulting oil was cooled, dried over calcium sulfate for one hour and then fractionated through a semimicro column. There was obtained 6.0 grams of gamma(2,5-dimethylpyrryl)propyltriethoxysilane distilling at a temperature of 119°–121° C. under a reduced pressure of 0.5 mm. Hg. The compound has an $n_D^{25}$ of 1.4587. Analysis for nitrogen content of the compound gave a value of 4.7 as compared for the corresponding calculated value of 4.68. The compound was also identified by infrared analysis.

What is claimed is:

1. A process for producing a pyrrole-containing organosilicon compound in which a pyrrole group is attached to the silicon atom thereof through a polymethylene chain of at least three carbon atoms which comprises forming a mixture of an aminoalkylalkoxysilane having the formula:

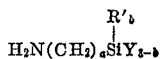

wherein R' represents a member selected from the group consisting of monocyclic and bicyclic hydrocarbon aryl groups having from 6 to 10 carbon atoms and lower alkyl groups, Y represents a lower alkoxy group, $a$ is an integer having a value from 3 to 4 inclusive, and $b$ is a number having a value of from 0 to 2, with a gamma-diketone composed of 2 carbonyl groups, a dimethylene chain interconnecting said carbonyl groups and a lower alkyl group connected to each of said carbonyl groups and heating the mixture to a temperature sufficiently elevated to cause said gamma-diketone and said aminoalkylalkoxysilane to react to produce said pyrrole-containing organosilicon compound.

2. A process for producing a pyrrole-containing organopolysiloxane in which the pyrrole group is attached to a silicon atom through a polymethylene chain of at least three carbon atoms which comprises forming a mixture of an aminoalkylpolysiloxane represented by the formula

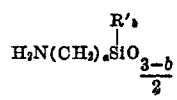

wherein R' is a member selected from the group consisting of monocyclic and bicyclic hydrocarbon aryl groups having from 6 to 10 carbon atoms and lower alkyl groups, $a$ is an integer having a value from 3 to 4 inclusive, and $b$ is a number having a value of from 0 to 2, with a gamma-diketone composed of 2 carbonyl groups, a dimethylene chain interconnecting said carbonyl groups and a lower alkyl group connected to each of said carbonyl groups and heating the mixture to a temperature sufficiently elevated to cause said gamma-diketone and said aminoalkylpolysiloxane to react to produce said pyrrole-containing organopolysiloxane.

3. A process for producing an organosilicon compound represented by the formula

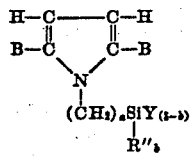

wherein B represents a lower alkyl group, R" is a member taken from the group consisting of monocyclic and bicyclic hydrocarbon aryl groups having from 6 to 10 carbon atoms and lower alkyl groups, Y represents a lower alkoxy group, $a$ is an integer having a value from 3 to 4 inclusive and $b$ is a number having a value of from 0 to 2 which comprises forming a mixture of an aminoalkylalkoxysilane represented by the formula

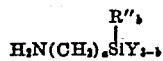

wherein R", $a$ and $b$ have the values defined, with a gamma-diketone represented by the formula

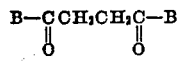

wherein B has the value defined and heating the mixture to a temperature of from about 100° C. to about 180° C. to cause said aminoalkylalkoxysilane and said gamma-diketone to react to produce said organosilicon compound.

4. A process for producing gamma(2,5-dimethylpyrrol)propyltriethoxysilane which comprises forming a mixture of gamma-aminopropyltriethoxysilane and acetonyl acetone and heating the mixture to a temperature of from about 100° C. to about 180° C. to cause said gamma-aminopropyltriethoxysilane and acetonyl acetone to react to form gamma(2,5-dimethylpyrrol)propyltriethoxysilane.

5. A process for producing delta(2,5-dimethylpyrrol)butylmethyldiethoxysilane which comprises forming a mixture of delta-aminobutylmethyldiethoxysilane and acetonyl acetone and heating the mixture to a temperature of from about 100° C. to about 180° C. to cause said delta-aminobutylmethyldiethoxysilane and acetonyl acetone to react to form delta(2,5-dimethylpyrrol)butylmethyldiethoxysilane.

6. An organosilicon compound represented by the formula

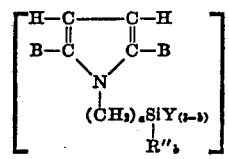

wherein B represents a lower alkyl group, R" is a member taken from the group consisting of monocyclic and bicyclic hydrocarbon aryl groups having from 6 to 10 carbon atoms and lower alkyl groups, Y represents a lower alkoxy group, $a$ is an integer having a value from 3 to 4 inclusive and $b$ is a number having a value of from 0 to 2.

7. An organopolysiloxane represented by the formula

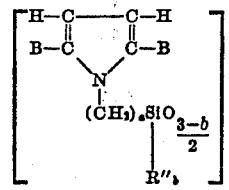

wherein B represents a lower alkyl group, R" is a member taken from the group consisting of monocyclic and bicyclic hydrocarbon aryl groups having from 6 to 10 carbon atoms and lower alkyl groups, $a$ is an integer having a value from 3 to 4 inclusive and $b$ is a number having a value of from 0 to 2.

8. Gamma(2,5-dimethylpyrrol)propyltriethoxysilane.

9. Delta(2,5-dimethylpyrrol)butylmethyldiethoxysilane.

References Cited in the file of this patent

Hazlewood et al.: Journal Proceedings Royal Society of New South Wales, March 1937, vol. 71, pp. 92–102.

UNITED STATES PATENT OFFICE
Certificate of Correction

Patent No. 2,881,184                                                              April 7, 1959

Ronald M. Pike

It is hereby certified that error appears in the printed specification of the above numbered patent requiring correction and that the said Letters Patent should read as corrected below.

Column 1, lines 35 to 40, the formula should read as shown below instead of as in the patent:

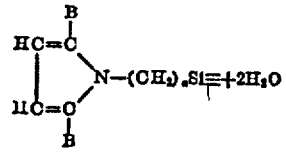

column 3, lines 27 to 30, the right-hand structural unit should read as shown below instead of as in the patent:

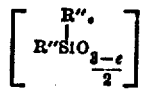

same column 3, line 31, after "wherein" strike out "R',"; column 5, line 23, for "organo-silicon compounds" read —silanes—; line 47, strike out "R''," first occurrence; column 6, lines 20 to 26, the formula should read as shown below instead of as in the patent:

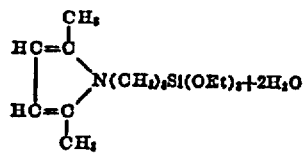

column 7, line 33, after "R''," insert —Y,—; same column 7, lines 43 and 44, and column 8, lines 1 and 2, for "gamma (2,5-dimethylpyrrol) propyltriethoxysilane" read —gamma (2,5-dimethylpyrryl) propyltriethoxysilane—; line 42, for "Gamma (2,5-dimethylpyrrol) propyltriethoxysilane" read —Gamma (2,5-dimethylpyrryl) propyltriethoxysilane—; column 8, lines 3 and 4, 9 and 10, for "delta (2,5-dimethylpyrrol) butylmethyldiethoxysilane" read —delta (2,5-dimethylpyrryl) butylmethyldiethoxysilane—; line 43, for "Delta (2,5-dimethylpyrrol) butylmethyldiethoxysilane" read —Delta (2,5-dimethylpyrryl) butylmethyldiethoxysilane—.

Signed and sealed this 29th day of March 1960.

[SEAL]

Attest:
KARL H. AXLINE,
*Attesting Officer.*

ROBERT C. WATSON,
*Commissioner of Patents.*